United States Patent
Van der Auwera et al.

(10) Patent No.: US 9,426,466 B2
(45) Date of Patent: Aug. 23, 2016

(54) TRANSFORM SKIP MODE

(71) Applicant: Qualcomm Incorporated, San Diego, CA (US)

(72) Inventors: Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 13/922,851

(22) Filed: Jun. 20, 2013

(65) Prior Publication Data

US 2013/0343464 A1 Dec. 26, 2013

Related U.S. Application Data

(60) Provisional application No. 61/663,453, filed on Jun. 22, 212.

(51) Int. Cl.
| | | |
|---|---|---|
| *H04N 19/122* | (2014.01) | |
| *H04N 19/60* | (2014.01) | |
| *H04N 19/176* | (2014.01) | |
| *H04N 19/12* | (2014.01) | |
| *H04N 19/186* | (2014.01) | |

(Continued)

(52) U.S. Cl.
CPC ........ *H04N 19/00775* (2013.01); *H04N 19/12* (2014.11); *H04N 19/157* (2014.11); *H04N 19/176* (2014.11); *H04N 19/186* (2014.11); *H04N 19/60* (2014.11); *H04N 19/46* (2014.11)

(58) Field of Classification Search
CPC .... H04N 19/122; H04N 19/60; H04N 19/12; H04N 19/157; H04N 19/176; H04N 19/186
USPC .................................................... 375/240.18
See application file for complete search history.

(56) References Cited

U.S. PATENT DOCUMENTS

2008/0198926 A1  8/2008 Bordes et al.
2010/0061447 A1* 3/2010 Tu .................. H04N 21/234381
                                                       375/240.03

(Continued)

FOREIGN PATENT DOCUMENTS

WO  2013001279 A2  1/2013

OTHER PUBLICATIONS

Weijia Zhu et al.: "Non Transform Mode for Inter Coding", 99. MPEG Meeting; Feb. 2-6, 2012; San Jose; (Motion Picture Expert Group or ISO/IEC JTC1/SC29/WG11), No. m22931, Jun. 7, 2012, XP030051456.*

(Continued)

*Primary Examiner* — Jamie Atala
*Assistant Examiner* — Patrick Demosky
(74) *Attorney, Agent, or Firm* — Shumaker & Sieffert, P.A.

(57) ABSTRACT

A device for coding video data includes a video coder configured to: determine for a chroma transform block (TB) a sub-sampling format for the chroma TB; based on the sub-sampling format for the chroma TB, identify one or more corresponding luma TBs; determine, for each of the one or more corresponding luma TBs, if the corresponding luma TB is coded using a transform skip mode; and, based on a number of the one or more corresponding luma TBs coded using the transform skip mode being greater than or equal to a threshold value, determine that the chroma TB is coded in the transform skip mode.

34 Claims, 8 Drawing Sheets

(51) Int. Cl.
*H04N 19/157* (2014.01)
*H04N 19/46* (2014.01)

(56) References Cited

U.S. PATENT DOCUMENTS

| | | | | |
|---|---|---|---|---|
| 2011/0013700 A1* | 1/2011 | Kim | ................... | H04N 19/176 375/240.18 |
| 2011/0243225 A1* | 10/2011 | Min | ................... | H04N 19/44 375/240.12 |
| 2012/0269258 A1* | 10/2012 | Yang | ................ | H04N 19/00163 375/240.02 |
| 2012/0328029 A1* | 12/2012 | Sadafale | ............. | H04N 19/176 375/240.29 |
| 2013/0016782 A1 | 1/2013 | Sasai et al. | | |
| 2013/0034152 A1 | 2/2013 | Song et al. | | |

OTHER PUBLICATIONS

Lan C et al.: "Intra transform skipping", 9. JCT-VC Meeting; 100. MPEG Meeting; Apr. 27-May 7, 2012; Geneva; (Joint Collaborative Team on Video Coding of ISO/IEC JTC1/SC29/WG11 and ITU-T SG.16), No. JCTVC-I0408, Apr. 17, 2012, XP030112171, cited in the application.*

Bross et al.: "High efficiency video coding (HEVC) text specification draft 7", 9th Meeting: Geneva Apr. 27-May 7, 2012, Joint Collaborative Team on Video Coding (JCT-VC) of ITU-T SG16 WP3 and ISO/IEC JTC1/SC29/WG11.*

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Preliminary Report on Patentability—PCT/US2013/047087, The International Bureau of WIPO—Geneva, Switzerland, Jul. 8, 2014, 17 pp.

International Search Report and Written Opinion—PCT/US2013/047087—ISA/EPO—Jan. 20, 2014, 16 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Lan et al., "Intra Transform Skipping," JCT-VC Meeting; MPEG Meeting; Geneva; (Joint Colloborative Team on Video Coding of ISO/IEC JTC1/SC29/WG11 and ITU-T SG.16), No. JCTVC-I0408, Apr. 27-May 7, 2012, 6 pp.

Onno et al., "Combination of J0171 and J0389 for the non-normative Encoder Selection of the Intra Transform Skip," JCT-VC Meeting; MPEG Meeting; Stockholm; (Joint Colloborative Team on Video Coding of ISO/IEC JTC1/SC29/WG11 and ITU-T SG.16) No. JCTVC-J0572, Jul. 11-20, 2012, 4 pp.

Partial International Search Report—PCT/US2013/047087—ISA/EPO—Sep. 16, 2013.

Van Der Auwera et al., "Intra Transform Skipping: Smallest CU and Implicit Chroma," JCT-VC Meeting, MPEG Meeting; (Joint Colloborative Team on Video Coding of ISO/IEC JTC1/SC29/WG11 and ITU-T SG.16), No. JCTVC-J0265, Jul. 11-20, 2012, 11 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Zhu et al., "Non Transform Mode for Inter Coding," MPEG Meeting; San Jose; (Motion Picture Expert Group or ISO/IEC JTC1/SC29/WG11), JCTVC_H0061, Feb. 1-10, 2012, 4 pp.

Bross et al., "Editors' Proposed Corrections to HEVC version 1," Joint Collaborative Team on Video Coding (JCT-VC) of ITU-T SG16 WP3 and ISO/IEC JTC1/SC29/WG11, 13th Meeting, Incheon, KR, Apr. 18-26, 2013, 310 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, JCTV-I1003_d4, 9th Meeting: Geneva, CH, Apr. 27-May 7, 2012, 297 pp.

* cited by examiner

4:2:0 sample format

4:2:2 sample format

4:4:4 sample format

16x16 CU with 4:2:0 Sample Formatting

○ Luma Sample
⊗ Chroma Samples

16x16 CU with 4:2:2 Sample Formatting

○ Luma Sample
⊗ Chroma Samples

TRANSFORM SKIP MODE

This application claims the benefit of U.S. Provisional Patent Application No. 61/663,453 filed 22 Jun. 2012, the entire content of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

According to the techniques of this disclosure, a video decoder may determine if a chroma transform block is coded using a transform skip mode by identifying corresponding luma transform blocks that correspond to the chroma transform block. Based on how many of the luma transform blocks are coded using the transform skip mode, the video decoder can determine whether the chroma transform block is coded using the transform skip mode without receiving a syntax element to explicitly identify if the chroma transform block is coded using the transform skip mode.

In one example, a method of decoding video data includes: determining for a chroma transform block (TB) a sub-sampling format for the chroma TB; based on the sub-sampling format for the chroma TB, identifying one or more corresponding luma TBs; receiving, for each of the one or more corresponding luma TBs, a flag indicating if the corresponding luma TB is coded using a transform skip mode; and, based on a number of the one or more corresponding luma TBs coded using the transform skip mode being greater than or equal to a threshold value, determining that the chroma TB is coded in the transform skip mode.

In another example, a method of decoding video data includes: determining for a chroma transform block (TB) a sub-sampling format for the chroma TB; based on the sub-sampling format for the chroma TB, identifying one or more corresponding luma TBs; generating, for each of the one or more corresponding luma TBs, a flag indicating if the corresponding luma TB is coded using a transform skip mode; and, based on a number of the one or more corresponding luma TBs coded using the transform skip mode being greater than or equal to a threshold value, encoding the chroma TB using the transform skip mode without generating a syntax element indicating the chroma TB is coded using the transform skip mode.

In another example, a device for coding video data includes a video coder configured to: determine for a chroma transform block (TB) a sub-sampling format for the chroma TB; based on the sub-sampling format for the chroma TB, identify one or more corresponding luma TBs; determine, for each of the one or more corresponding luma TBs, if the corresponding luma TB is coded using a transform skip mode; and based on a number of the one or more corresponding luma TBs coded using the transform skip mode being greater than or equal to a threshold value, determine that the chroma TB is coded in the transform skip mode.

In another example, an apparatus for coding video data includes: means for determining for a chroma transform block (TB) a sub-sampling format for the chroma TB; means for identifying one or more corresponding luma TBs based on the sub-sampling format for the chroma TB; means for coding, for each of the one or more corresponding luma TBs, a flag indicating if the corresponding luma TB is coded using a transform skip mode; and means for determining that the chroma TB is coded in the transform skip mode based on a number of the one or more corresponding luma TBs coded using the transform skip mode being greater than or equal to a threshold value.

In another example, a computer readable storage medium storing instructions that when executed cause one or more processors to: determine for a chroma transform block (TB) a sub-sampling format for the chroma TB; identify one or more corresponding luma TBs based on the sub-sampling format for the chroma TB; code, for each of the one or more corresponding luma TBs, a flag indicating if the corresponding luma TB is coded using a transform skip mode; and, determine that the chroma TB is coded in the transform skip mode based on a number of the one or more corresponding luma TBs coded using the transform skip mode being greater than or equal to a threshold value.

The details of one or more examples are set forth in the accompanying drawings and the description below. Other features, objects, and advantages will be apparent from the description and drawings, and from the claims.

DETAILED DESCRIPTION

Figure 1:
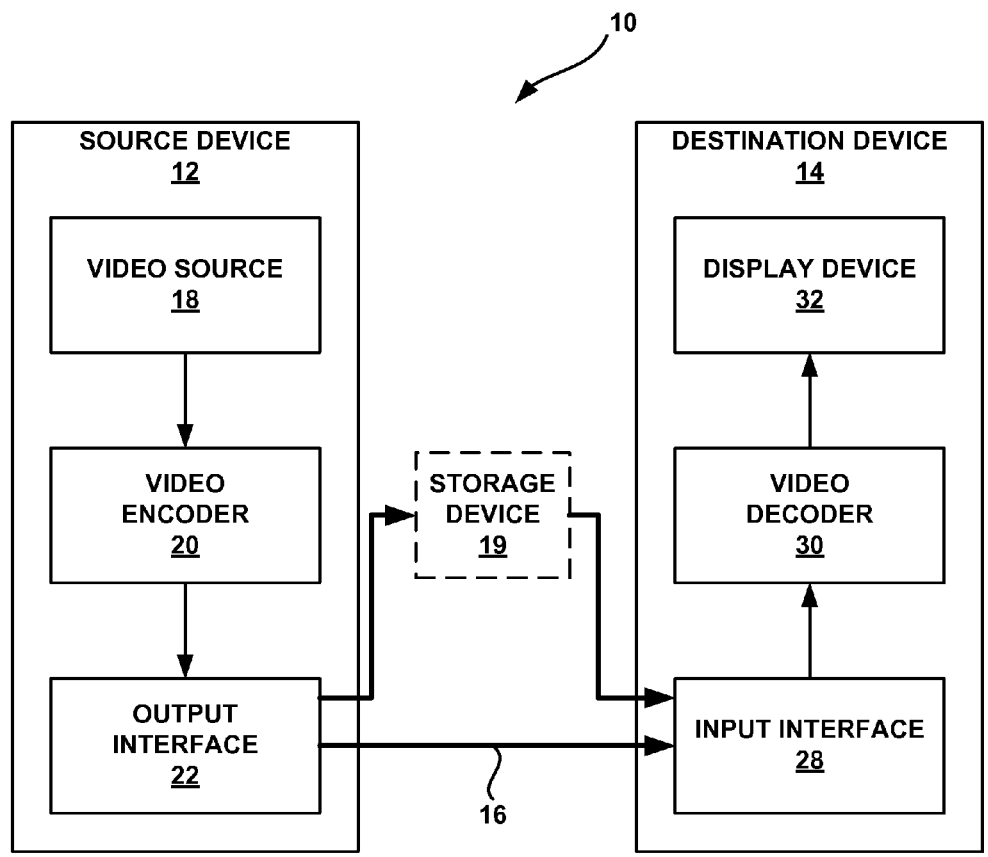
FIG. 1 is a block diagram illustrating an example video encoding and decoding system that may utilize the techniques described in this disclosure.

Various proposals for the emerging High Efficiency Video Coding (HEVC) standard have included a transform skip mode for coding transform units (TUs). The transform skip mode may increase coding efficiency for some types of video content. Various video coding standards, including the HEVC standard, include the coding of residual data, which represents a difference between an original block of video data and a predicted block of video data, such as an inter predicted block of video data or an intra predicted block of video data. A video encoder typically transforms, quantizes, and entropy encodes the residual data. The video encoder transforms the residual data by applying a transform, such as a discrete cosine transform (DCT), or some conceptually similar transform, to the data in the pixel domain to produce transform coefficients in a transform domain, and the video encoder then quantizes the resulting transforming coefficients.

When a video decoder receives the encoded residual data, the video decoder generally performs the inverse of the operations performed by the video encoder. For example, the video decoder may entropy decode quantized transform coefficients, dequantize the transform coefficients, and finally perform an inverse transform process to transform the transform coefficients back to residual data in the pixel domain. Once pixel domain residual data is obtained, the video decoder may add the residual data to a predicted block of video data to form a reconstructed block of video data. The reconstructed video block approximates an original block of video data. Various filter operations such as a deblocking filter, sample adaptive offset (SAO), and/or an adaptive loop filter (ALF) may be applied to the reconstructed video block to further improve quality of reconstructed video data.

In a transform skip mode, the transform and inverse transform processes are skipped. In other words, a video encoder may quantize and entropy encode the pixel domain residual data, and a video decoder may entropy decode and dequantize the pixel domain residual data. The pixel domain data, however, is not transformed into a transform domain by a video encoder. Likewise, because no transform domain data is received by a video decoder, the video decoder need not perform an inverse transform operation to transform the residual data back to the pixel domain. The video encoder generates flags for inclusion in the encoded video bitstream to indicate if a particular TU is coded using transform skipping. In some implementations, transform skipping may only be used for certain types of TUs, such as 4×4 intra TUs. Although this disclosure may describe several examples with reference to 4×4 intra TUs, it should not be assumed that the techniques of this disclosure are limited only to 4×4 intra TUs. The techniques of this disclosure may be extended to other sizes of intra TUs as well as to inter TUs. Transform skipping may, for example, be enabled by including a "transform_skip_enabled_flag" syntax element in a parameter set, such as a sequence parameter set (SPS) or some other parameter set, and by including a "transform_skip_flag" syntax element (also potentially referred to as a "ts_flag" syntax element) in the residual coding syntax. The value of the "transform_skip_enabled_flag" syntax element may enable or disable transform skipping for all TUs of a sequence. When transform skipping is enabled for a sequence (e.g. the "transform_skip_enabled_flag" is set to true), each TU in the sequence can have an associated "transform_skip_flag" syntax element to indicate if that TU is coded using the transform skip mode. As used in this disclosure, a value of true for a transform_skip_flag means the TU is coded using a transform skip mode, and a value of false for the transform_skip_flag means the TU is not coded using a transform skip mode.

Various implementations of transform skip mode in HEVC support 4×4 intra transform skipping for both luminance and chrominance components, thus requiring that separate transform_skip_flag syntax elements be signaled for luma and chroma 4×4 transform blocks (TBs). This disclosure introduces techniques for deriving a transform_skip_flag value for a chroma component based on a chroma type (e.g. a sub-sampling format) and one or more transform_skip_flag values associated with a luma component. This disclosure uses terminology such as "derive a chroma transform_skip_flag value for a chroma TB" so that the processes for chroma TBs can be analogized to the processes used for luma TBs, but when implementing the techniques of this disclosure, no "transform_skip_flag" syntax elements need to be included in an encoded bitstream. Accordingly, when this disclosure discusses deriving a chroma transform_skip_flag value, such description may be broadly construed to mean determining whether or not a chroma TB is coded using a transform skip mode. When implementing the techniques of this disclosure, a transform_skip_flag for chroma components does not need to be included in the encoded bitstream, which may reduce signaling overhead by reducing the number of syntax elements that need to be included in the encoded video bitstream.

The luma and chroma components of pixels in a CU or TU may be coded in different sub-sampling formats. In one proposal for HEVC, the luma and chroma components of a pixel are coded in a 4:2:0 format. In a 4:2:0 pixel format, for every 2×2 block of pixels, there are four luma components and 2 chroma components (e.g., 1 Cr chroma component and 1 Cb chroma component). As such, in a 2×2 block of pixels, the chroma components are sampled at ½ horizontal resolution and ½ vertical resolution. In a 4:2:2 pixel format, for every 2×2 block of pixels, there are four luma components and 4 chroma components (e.g., 2 Cr chroma components and 2 Cb chroma components). As such, for a 4:2:2 format, the chroma components are sampled at one-half (½) horizontal resolution and full vertical resolution. The 4:4:4 pixel format involves no sub-sampling of chroma components. That is, for a 2×2 block of pixels, there are four luma components, four Cr components, and four Cb components.

According to the techniques of this disclosure, a video decoder may derive a chroma transform_skip_flag value for a chroma TB from luma flag values by identifying corresponding luma 4×4 intra TBs that correspond to the chroma 4×4 intra TB. The determination of how many luma 4×4 intra TBs correspond to the chroma 4×4 TB depends on the chroma sub-sampling format used to code the chroma 4×4 TB.

According to one example, if the chroma format is 4:2:0, then the video decoder may derive a chroma transform_skip_flag value for a chroma TB from luma flag values by identifying four luma 4×4 intra TBs that correspond to the chroma 4×4 intra TB. If at least N out of the four luma 4×4 intra TBs have a transform_skip_flag value equal to true, then the corresponding transform_skip_flag of the chroma 4×4 intra TB is set equal to true. N may be any value between 1 and 4. Thus, if greater than 4-N out of the four luma 4×4 intra TBs have a transform_skip_flag value equal to false, then the corresponding transform_skip_flag of the chroma 4×4 intra TB is set equal to false.

According to another example, if the chroma format is 4:2:2, then a video decoder may derive a chroma transform_skip_flag value from luma flag values by identifying two horizontally adjacent (left and right of each other) luma 4×4 intra TBs that correspond to one chroma 4×4 intra TB. In one implementation, the video decoder may determine that the chroma transform_skip_flag has a value of true, if at least one corresponding luma flag equals true. In this implementation, the video decoder may determine that the chroma transform_skip_flag has a value of false, only if both corresponding luma flags equal to false. Alternatively, the video decoder may determine that the chroma transform_skip_flag has a value of true, only if both corresponding luma flags equal true. In this alternate implementation, the video decoder may determine that the chroma transform_skip_flag has a value of false, if at least one corresponding luma flag equals false.

According to another example, if the chroma format is 4:4:4, then a video decoder can derive a chroma transform_skip_flag value from luma flag values by, for each luma 4×4 intra TB, identifying one corresponding chroma 4×4 intra TB The video decoder may then derive a value of true for the chroma transform_skip_flag if the corresponding luma transform_skip_flag equals true, or the video decoder may derive a value of false for the chroma transform_skip_flag if the corresponding luma transform_skip_flag equals false.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. According to the techniques of this disclosure, source device 12 may, for example, generate encoded video data that includes residual data coded using a transform skip mode, and likewise destination device 14 may decode the video data including the residual data coded using a transform skip mode. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 19. Similarly, encoded data may be accessed from storage device 19 by input interface. Storage device 19 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 19 may correspond to a file server or another intermediate storage device that may hold the encoded video generated by source device 12. Destination device 14 may access stored video data from storage device 19 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 19 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 19 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 19, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). A recent draft of the HEVC standard, referred to as "HEVC Working Draft 7" or "WD7," is described in document HCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9$^{th}$ Meeting: Geneva, Switzerland, 27 Apr. 2012 to 7 May 2012, which, as of 19 Jun. 2013, is downloadable from http://phenix.it-sudparis.eu/jct/doc_end_user/documents/9_Geneva/wg11/JCTVC-11003-v3.zip. Development of the HEVC standard is ongoing, and a newer draft of the upcoming HEVC standard, referred to as "HEVC Working Draft 10" or "HEVC WD10," is described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which as of 19 Jun. 2013, is available from http://phenix.int-evey.fr/jct/doc_end_user/documents/13_Incheon/wg11/JCTVC-M0432-v3.zip, the entire content of which is hereby incorporated by reference.

Video encoder 20 and video decoder 30 may alternatively operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Thus, according to the HEVC, a CU may include one or more prediction units (PUs) and/or one or more transform units (TUs). This disclosure also uses the term "block", "partition," or "portion" to refer to any of a CU, PU, or TU. In general, "portion" may refer to any sub-set of a video frame. Further, this disclosure typically uses the term "video block" to refer to a coding node of a CU. In some specific cases, this disclosure may also use the term "video block" to refer to a treeblock, i.e., LCU, or a CU, which includes a coding node and PUs and TUs. Thus, a video block may correspond to a coding node within a CU and video blocks may have fixed or varying sizes, and may differ in size according to a specified coding standard.

A video sampling format, which may also be referred to as a chroma format, may define the number of chroma samples included in a CU with respect to the number of luma samples included in a CU. Depending on the video sampling format for the chroma components, the size, in terms of number of samples, of the U and V components may be the same as or different from the size of the Y component. In the H.264/AVC standard and draft versions of the HEVC standard, a value called chroma_format_idc is defined to indicate different sampling formats of the chroma components, relative to the luma component. In HEVC WD8, chroma_format_idc is signaled in the SPS. Table 1 illustrates the relationship between values of chroma_format_idc and associated chroma formats.

TABLE 1 different chroma formats defined in H.264/AVC

| chroma_format_idc | chroma format | SubWidthC | SubHeightC |
|---|---|---|---|
| 0 | monochrome | — | — |
| 1 | 4:2:0 | 2 | 2 |
| 2 | 4:2:2 | 2 | 1 |
| 3 | 4:4:4 | 1 | 1 |

In Table 1, the variables SubWidthC and SubHeightC can be used to indicate the horizontal and vertical sampling rate ratio between the number of samples for the luma component and the number of samples for each chroma component. In the chroma formats described in Table 1, the two chroma components have the same sampling rate.

In the example of Table 1, for the 4:2:0 format, the sampling rate for the luma component is twice that of the chroma components for both the horizontal and vertical directions. As a result, for a coding unit formatted according to the 4:2:0 format, the width and height of an array of samples for the luma component are twice that of each array of samples for the chroma components. Similarly, for a coding unit formatted according to the 4:2:2 format, the width of an array of samples for the luma component is twice that of the width of an array of samples for each chroma component, but the height of the array of samples for the luma component is equal to the height of an array of samples for each chroma component. For a coding unit formatted according to the 4:4:4 format, an array of samples for the luma component has the same width and height as an array of samples for each chroma component. It should be noted that in addition to the YUV color space, video data can be defined according to an RGB space color. In this manner, the chroma formats described herein may apply to either the YUV or RGB color space. RGB chroma formats are typically sampled such that the number of red samples, the number of green samples and the number of blue samples are equal. Thus, the term "4:4:4 chroma format" as used herein may refer to either a YUV color space or an RGB color space wherein the number of samples is equal for all color components.

Figure 2A:
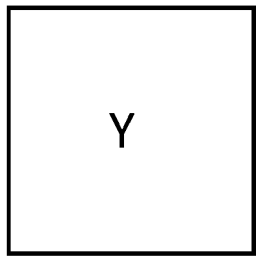
FIGS. 2A-2C are conceptual diagrams illustrating different sample formats for video data.
Figure 2A:
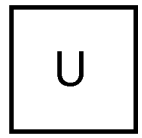
Figure 2A:
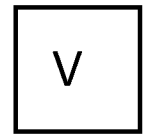
Figure 2B:
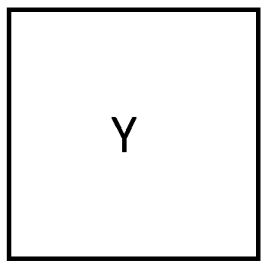
Figure 2B:
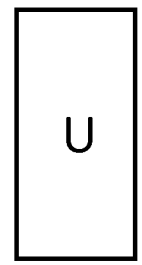
Figure 2B:
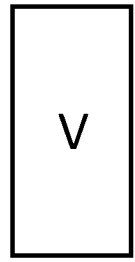
Figure 2C:
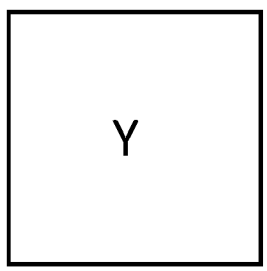
Figure 2C:
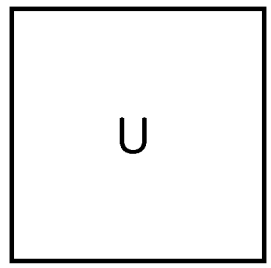
Figure 2C:
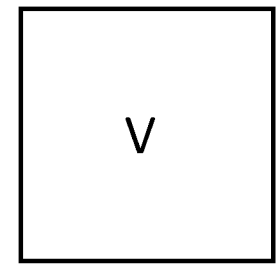

FIGS. 2A-2C are conceptual diagrams illustrating different sample formats for video data. FIG. 2A is a conceptual diagram illustrating the 4:2:0 sample format. As illustrated in FIG. 2A, for the 4:2:0 sample format, the chroma components are one quarter of the size of the luma component. Thus, for a CU formatted according to the 4:2:0 sample format, there are four luma samples for every sample of a chroma component. FIG. 2B is a conceptual diagram illustrating the 4:2:2 sample format. As illustrated in FIG. 2B, for the 4:2:2 sample format, the chroma components are one half of the size of the luma component. Thus, for a CU formatted according to the 4:2:2 sample format, there are two luma samples for every sample of a chroma component. FIG. 2C is a conceptual diagram illustrating the 4:4:4 sample format. As illustrated in FIG. 2C, for the 4:4:4 sample format, the chroma components are the same size of the luma component. Thus, for a CU formatted according to the 4:4:4 sample format, there is one luma sample for every sample of a chroma component.

Figure 3:
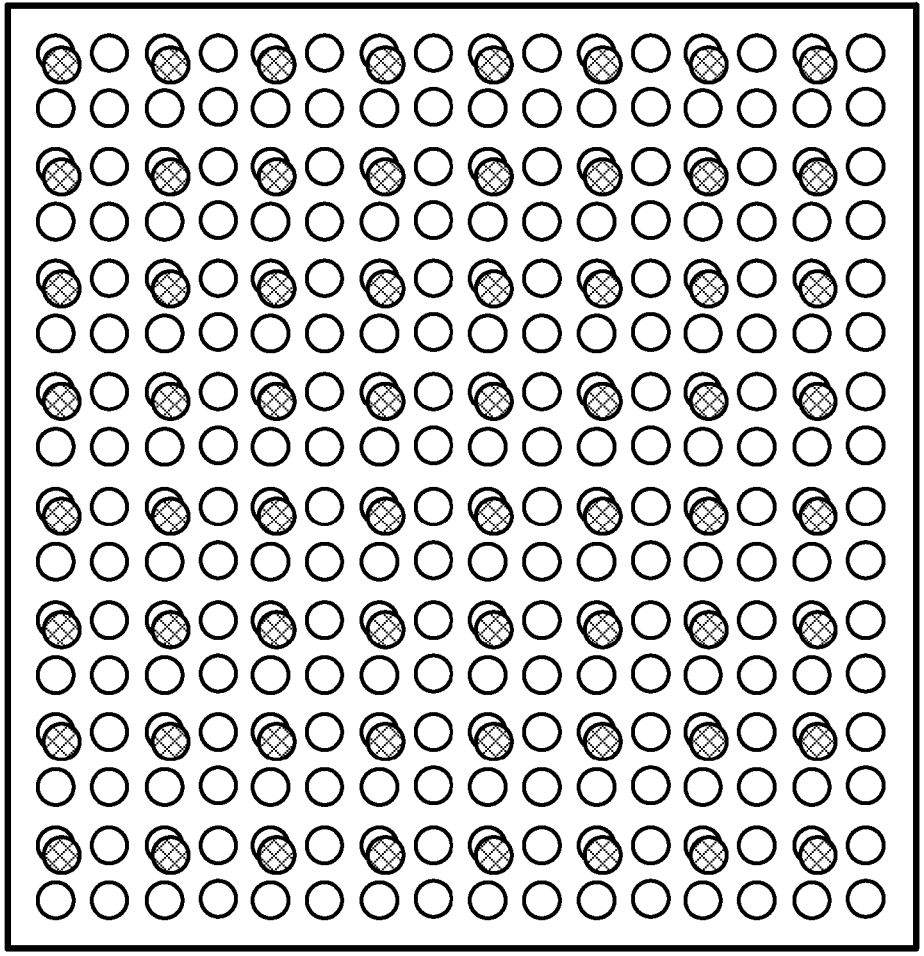
FIG. 3 is a conceptual diagram illustrating a 16×16 coding unit formatted according to a 4:2:0 sample format.

FIG. 3 is a conceptual diagram illustrating an example of a 16×16 coding unit formatted according to a 4:2:0 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:0 sample format includes 16×16 samples of luma components and 8×8 samples for each chroma component. Further, as described above, a CU may be partitioned into smaller CUs. For example, the CU illustrated in FIG. 3 may be partitioned into four 8×8 CUs, where each 8×8 CU includes 8×8 samples for the luma component and 4×4 samples for each chroma component.

Figure 4:
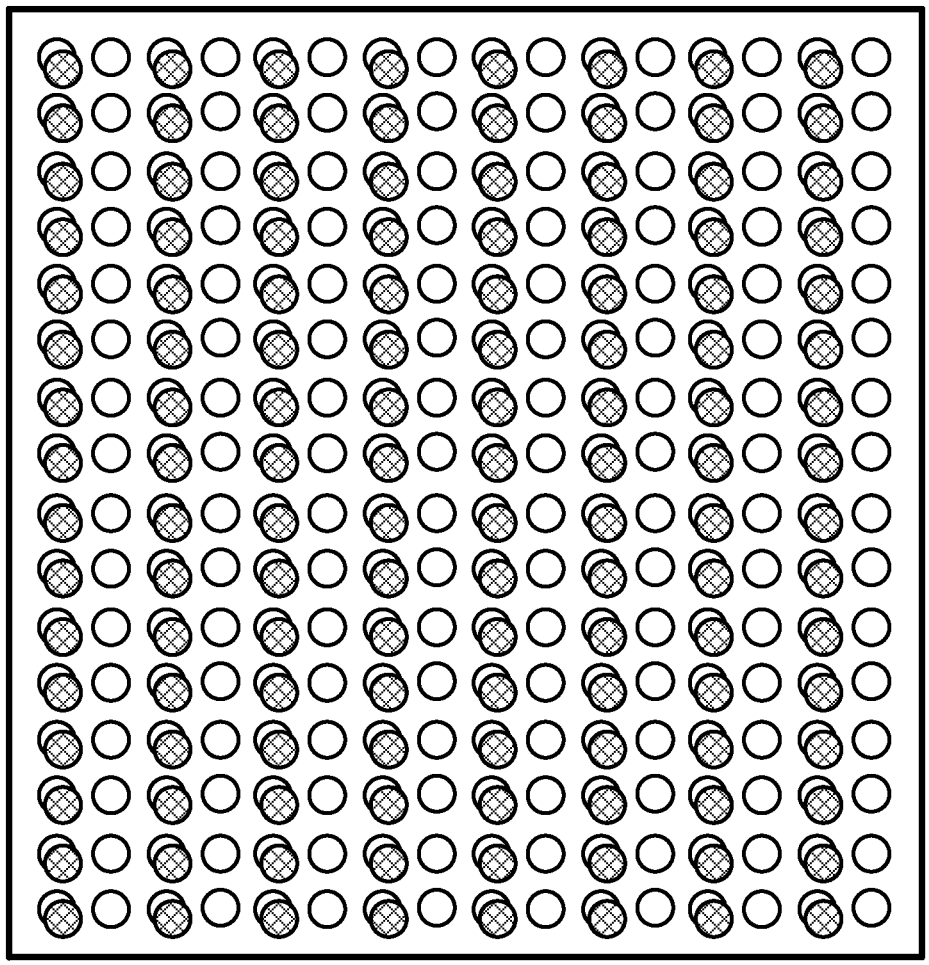
FIG. 4 is a conceptual diagram illustrating a 16×16 coding unit formatted according to a 4:2:2 sample format.

FIG. 4 is a conceptual diagram illustrating an example of a 16×16 coding unit formatted according to a 4:2:2 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:2 sample format includes 16×16 samples of luma components and 8×16 samples for each chroma component. Further, as described above, a CU may be partitioned into smaller CUs. For example, the CU illustrated in FIG. 4 may be partitioned into four 8×8 CUs, where each CU includes 8×8 samples for the luma component and 4×8 samples for each chroma component.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. As introduced previously, video encoder 20 may alternatively code the TUs in a transform skip mode in which the residual data is quantized and entropy coded but not transformed.

Video encoder 20 may perform quantization of the transform coefficients in instances when a transform is applied or may perform quantization on the pixel domain data when the TU is coded in a transform skip mode. Quantization generally refers to a process in which values (e.g. transform coefficients or pixel domain values) are quantized to possibly reduce the amount of data used to represent the values, providing further compression. The quantization process may reduce the bit depth associated with some or all of the values. For example, an n-bit value may be rounded down to an m-bit value during quantization, where n is greater than m.

In some examples, video encoder 20 may utilize a predefined scan order to scan the quantized transform coefficients, or pixel domain residual values if a TU is coded in a transform skip mode, to produce a serialized vector that can be entropy encoded. In other examples, video encoder 20 may perform an adaptive scan. After scanning the quantized transform coefficients or pixel domain residual values to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. The transform_skip_flag may, for example, be CABAC coded with one context per luma/chroma component, or alternatively, the transform_skip_flag may be bypass coded. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Transform skipping for 4×4 intra TUs has been adopted into the working draft of the HEVC standard. In a transform skip mode, quantization is applied to residual values without applying a transform. The quantized residual values are then signaled in a video bitstream using, for example, variable length coding or other coding techniques. Except for adding one flag to indicate whether a 4×4 intra TU is coded in a transform skip mode or a transform mode, the introduction of transform skipping generally does not require alteration to the prediction, quantization (scaling), in-loop filters, and entropy coding modules of an encoder, decoder or combined codec. Transform skipping may be enabled by a transform_skip_enabled_flag that is present in a parameter set such as an SPS for coded video and by a ts_flag (also called a transform_skip_flag) in the residual coding syntax.

One particular mode for transform skipping for 4×4 intra TU's is described in JCTVC-I0408, "Intra transform skipping" (C. Lan (Xidian Univ.), J. Xu, G. J. Sullivan, F. Wu (Microsoft), hereinafter "Lan document"). The Lan document described the following modifications for implementing transform skip mode:

(a) Prediction: No change.
(b) Transform: Skipped. Instead, for transform skipping TUs, a simple scaling process is used. As a 4×4 inverse transform in the current design scales down the coefficients by 32, to let transform skipping TUs have similar magnitudes as other TUs, a scaling-down process by 32 is performed on transform skipping TUs.
(c) De-quantization and scaling. No change.
(d) Entropy coding: A flag for each 4×4 intra TU is sent by an encoder, and received by a decoder, to indicate if the transform to a TU containing residual error values is bypassed or not. Two contexts are added to code the flag for Y, U and V TUs.
(e) Deblocking, SAO and ALF: No change.
(f) A flag in the SPS is signaled to indicate whether transform skipping is enabled or not.
(g) No change to the quantization process for TUs with transform skipping. That is also the case when quantization matrices are used. Because it may not be reasonable to have different quantization parameters according to spatial locations for those TUs with transform skipping, it was also suggested that the default quantization matrix be changed to a flat matrix for 4×4 intra TUs, when transform skipping is enabled. The other reason is that a small transform tends to use a flat quantization matrix. An alternative to this is to leave to the encoder how to better use quantization matrix and transform skipping simultaneously.

In other examples, for TUs of any size or any prediction mode (inter or intra), one or more so-called "transform skip modes" may be supported. With transform skipping, instead of always applying a 2-D transform to a residual block, the transform skip mode (or modes) may offer more choices. In one example, the transform mode choices may include: 2-D transform, no transform, horizontal transform (vertical transform is skipped), and vertical transform (horizontal transform is skipped). The choice of the transform can be signaled to the decoder as part of an encoded bitstream, e.g., for each block the transform may be signaled or derivable.

A transform_skip_flag is currently signaled for every 4×4 intra TU that is chosen within a residual quadtree transform (RQT) within an intra-coded coding unit (CU) of any allowed size. However, it has been observed that for some types of video data, such as low motion video for example, most of the coding efficiency from intra transform skipping is achieved when the smallest coding unit (SCU) size is chosen by the video encoder. Therefore, signaling transform_skip_flags for CUs of all sizes may at times produce an undesirable computational and signaling overhead. The techniques of this disclosure may, in some instances, reduce this undesirable overhead by not coding transform_skip_flags for CUs that are not SCUs and only coding transform_skip_flags for CUs that are SCUs.

The current transform skip method supports 4×4 intra transform skipping for both luminance and chrominance components, meaning that the transform_skip_flag is signaled for both luma and chroma 4×4 intra TUs. The HM encoder for WD7 has two modes ("normal" and "fast"). In the normal encoder mode, full rate distortion optimization (RDO) is performed for both luma and chroma independently. In the fast encoder mode, full RDO is not performed for chroma independently, but in the fast encoder mode, the chroma transform_skip_flags are still signaled for both luma and chroma TBs, which again may create an undesirable overhead. It has been observed that the coding efficiency of chroma 4×4 intra TU transform skipping is limited. Accordingly, this disclosure describes techniques for deriving chroma transform_skip_flags based on luma transform flags at both an encoder and a decoder, such that the transform_skip_flags for chroma TBs do not need to be included in the encoded bitstream. Thus, a video encoder configured in accordance with the techniques of this disclosure, such as video encoder 20, may encode a TB using a transform skip mode without generating a dedicated syntax element indicating the chroma TB is coded using the transform skip mode. Similarly, a video decoder configured in accordance with the techniques of this disclosure, such as video decoder 30, may decode a TB using a transform skip mode without receiving a dedicated syntax element indicating the chroma TB is coded using the transform skip mode.

To potentially further reduce the overhead from signaling the transform_skip_flag for every 4×4 intra TU for each CU size, techniques of this disclosure also include restricting the signaling of the transform_skip_flag to the smallest CU size only, which is determined by the appropriate configuration parameters for the encoder and decoder (for example, SPS syntax parameter log 2_min_coding_block_size_minus3). Video encoder 20 and video decoder 30 may be configured to use any or all of these techniques, alone or in any combination. Thus, for CUs that are not the smallest allowed CU size, a video encoder may not generate a transform_skip_flag, and a video decoder may not receive a transform_skip_flag.

Table 2 illustrates an example change to the residual coding syntax that may implement the techniques of this disclosure. The portion of the code below that reads "log 2CbSize==Log 2MinCbSize" (italicized in Table 2) restricts the transmitting and receiving of a transform_skip_flag to instances when the size of a CU being coded is equal to the smallest size enabled for CUs. The smallest size enabled for a CU can be determined from a parameter set such as an SPS or some other parameter set.

TABLE 2

Residual coding syntax change to restrict signaling of transform_skip_flag to SCU

| residual_coding( x0, y0, log2TrafoWidth, log2TrafoHeight, scanIdx, cIdx ) { | Descriptor |
|---|---|
|     if( log2TrafoWidth == 1 \|\| log2TrafoHeight == 1 ) { | |
|         log2TrafoWidth = 2 | |
|         log2TrafoHeight = 2 | |
|     } | |
|     If( transform_skip_enabled_flag && !cu_transquant_bypass_flag && PredMode == MODE_INTRA) && (*log2CbSize == Log2MinCbSize*) && ( log2TrafoWidth == 2) && (log2TrafoHeight == 2) ) | |
|         transform_skip_flag[ x0 ][ y0 ][ cIdx ] | ae(v) |
| . . . | |

Techniques of this disclosure include restricting intra transform skipping to luma components. To disable the signaling of the transform_skip_flag for chroma, the residual coding syntax change is indicated in Table 3 (see italics). In this solution, transform skipping is not signaled for chroma.

TABLE 3

Residual coding syntax change to restrict signaling of transform_skip_flag to luma

| residual_coding( x0, y0, log2TrafoWidth, log2TrafoHeight, scanIdx, cIdx ) { | Descriptor |
|---|---|
| . . . | |
| If( transform_skip_enabled_flag && !cu_transquant_bypass_flag && (PredMode == MODE_INTRA) && (*cIdx == 0*) && ( log2TrafoWidth == 2) && (log2TrafoHeight == 2) ) | |
|     transform_skip_flag[ x0 ][ y0 ][ cIdx ] | ae(v) |
| . . . | |

This disclosure describes techniques for deriving chroma transform_skip_flag values from luma (4:2:0). The current fast encoder mode (HM7.0) derives the values of the chroma transform_skip_flags from the values of the luma transform_skip_flags. If the chroma type is 4:2:0, then 4 luma 4×4 intra TUs correspond with one chroma 4×4 intra TU. In addition, if transform skipping would be enabled for the 8×8 TU size, then one luma 8×8 intra TU would correspond with one chroma 4×4 intra TU. The HM7.0 encoder determines the value of the chroma transform_skip_flag for the chroma 4×4 intra TU as follows. If at least three of the four luma 4×4 intra TUs have a transform_skip_flag value equal to true, then the corresponding transform_skip_flag of the chroma 4×4 intra TU is set equal to true. However, the HM7.0 encoder signals this derived chroma transform_skip_flag, which represents an overhead. The solution is to disable signaling of the chroma transform_skip_flag and instead derive the chroma transform skip mode at the decoder side from the values of the luma transform_skip_flags or corresponding luma components. To avoid drift between the encoder and decoder, the rule that is employed by the encoder must also be applied by the decoder.

This disclosure describes techniques for deriving Chroma transform_skip_flag Values from Luma (4:2:2). If the chroma format is 4:2:2, then the derivation of chroma transform_skip_flag values from luma flag values, may be achieved as follows. In the 4:2:2 format, two horizontally adjacent luma 4×4 intra TUs correspond with one chroma 4×4 intra TU. In this case, the chroma transform_skip_flag may be assigned value true, if at least one of the two corresponding luma transform_skip_flags equals true. Alternatively, the chroma transform_skip_flag may be assigned the value true, if both corresponding luma flags equal true.

To avoid drift between encoder and decoder, the rule that is employed by the encoder must also be applied by the decoder.

This disclosure describes techniques for deriving Chroma transform_skip_flag values from Luma (4:4:4). If the chroma format is 4:4:4, then the derivation of chroma transform_skip_flag values from luma flag values, may be achieved as follows. In the 4:4:4 format, each luma 4×4 intra TU corresponds with one chroma 4×4 intra TU. Hence, the chroma transform_skip_flag may be assigned the value true, if the corresponding luma transform_skip_flag equals true. To avoid drift between encoder and decoder, the rule that is employed by the encoder must also be applied by the decoder.

This disclosure describes techniques for bypass coding of transform_skip_flag. In the current transform skipping method, the transform_skip_flag is CABAC coded with one context per luma/chroma component. Alternatively, the transform_skip_flag may be bypass coded. In general, video encoder 20 and video decoder 30 may be configured to perform any or all of the techniques described above, alone or in any combination.

Figure 5:
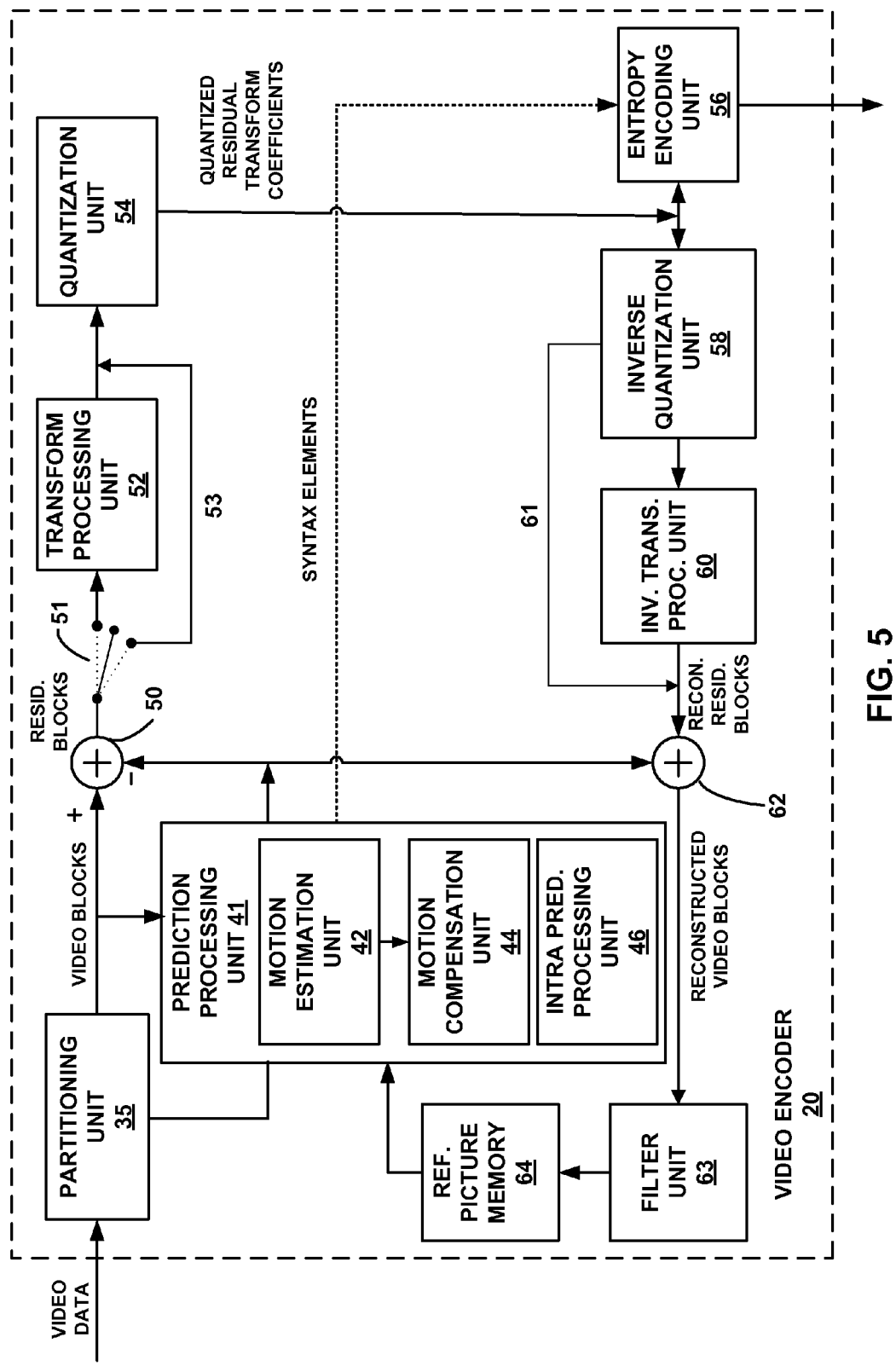
FIG. 5 is a block diagram illustrating an example video encoder that may implement the techniques described in this disclosure.

FIG. 5 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 5, video encoder 20 includes a partitioning unit 35, prediction unit 41, filter unit 63, reference picture memory 64, summer 50, transform processing unit 52, quantization unit 54, and entropy encoding unit 56.

Prediction unit 41 includes motion estimation unit 42, motion compensation unit 44, and intra-prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 5 as being an in loop filter, in other configurations, filter unit 63 may be implemented as a post loop filter.

As shown in FIG. 5, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction unit 41 may select one of a plurality of possible coding modes, such as one of a plurality of intra coding modes or one of a plurality of inter coding modes, for the current video block based on error results (e.g., coding rate and the level of distortion). Prediction unit 41 may provide the resulting intra- or inter-coded block to summer 50 to generate residual block data and to summer 62 to reconstruct the encoded block for use as a reference picture.

Intra-prediction processing unit 46 within prediction unit 41 may perform intra-predictive coding of the current video block relative to one or more neighboring blocks in the same frame or slice as the current block to be coded to provide spatial compression. Motion estimation unit 42 and motion compensation unit 44 within prediction unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. After prediction unit 41 generates the predictive block for the current video block via either inter-prediction or intra-prediction, video encoder 20 forms a residual video block by subtracting the predictive block from the current video block.

As discussed above, the residual video data in the residual block may be included in one or more TUs, and the TUs may either be coded in a transform mode or a transform skip mode. Switch 51 represents a switch, or conceptual switch, that chooses between the transform mode and the transform skip mode. When the transform mode is selected, the TUs are sent to transform processing unit 52, and transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain. As part of the encoding process, video encoder 20 may test a number of different coding scenarios to determine a scenario that produces a desired rate-distortion tradeoff. As part of testing these various scenarios, video encoder 20 may, for example, test scenarios that include coding some TUs in a transform mode while in other scenarios those TUs may be coded in a transform skip mode.

Syntax elements, such as the transform_skip_enabled_flag and transform_skip_flag discussed above, may be included in the encoded video bitstream to identify if a particular TU is coded using a transform mode or a transform skip mode. As described above, the TUs included in the encoded bitstream include both luma TUs and chroma TUs. For the luma TUs, video encoder 20 may generate syntax elements to indicate if the luma TUs are coded in a transform skip mode. For chroma TUs, however, rather than generating syntax elements identifying if the chroma TU is coded in a transform skip mode, video encoder 20 may derive the syntax elements to determine if the chroma TUs are coded in the transform skip mode, meaning that video encoder 20 does not explicitly generate syntax elements indicating if the chroma TUs are coded in the transform skip mode.

As has been described above, according to the techniques of this disclosure, a video decoder, such as video decoder 30 can derive whether or not a chroma TU is coded in a transform skip mode based on whether or not corresponding luma TUs are coded in a transform skip mode. Video encoder 20 can be configured to encode video data in accordance with the derivation process implemented by video decoder 30. For example, if the subsampling format for a particular chroma TU is 4:4:4, then video encoder 20 can be configured to code a chroma TU and luma TU either both using a transform mode or both using a transform skip mode. If the subsampling format for a particular chroma TU is 4:2:2, then video encoder 20 can be configured to code a chroma TU using a transform skip mode if both corresponding luma TUs are coded using a transform skip mode or code a chroma TU using a transform mode if both corresponding luma TUs are coded using transform mode. If one corresponding luma TU is coded using a transform skip mode and the other is coded using transform mode, then video encoder 20 may be configured to code the corresponding chroma TU using either a transform mode or a transform skip mode, provided video decoder 30 is configured to derive the transform mode or transform skip mode for the corresponding chroma TU in the same manner. If the subsampling format for a particular chroma TU is 4:2:0, then video encoder 20 can be configured to code a chroma TU using a transform skip mode based on if a threshold number of corresponding luma TUs are coded using a transform skip mode. That threshold value may be any value between 1 and 4, again provided video decoder 30 is configured to derive the transform mode or transform skip mode for the corresponding chroma TU in the same manner.

Transform processing unit 52 may send the resulting transform coefficients to quantization unit 54. When the transform skip mode is selected, switch 51 directs the residual data along data path 53, which bypasses transform processing unit 52 and sends the pixel domain residual data to quantization unit 54. Accordingly, when the transform skip mode is selected, no transform is applied to the residual data.

Quantization unit 54 quantizes the transform coefficients in the case of a transform mode or quantizes the pixel domain residual data in the case of a transform skip mode to further reduce bit rate. The quantization process may reduce the bit depth associated with some or all of the values. The degree of quantization may be modified by adjusting a quantization parameter. In some examples, quantization unit 54 may then perform a scan of the matrix including the quantized values. Alternatively, entropy encoding unit 56 may perform the scan.

Following quantization, entropy encoding unit 56 entropy encodes the quantized values. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

For TUs coded in a transform mode, inverse quantization unit 58 and inverse transform processing unit 60 apply inverse quantization and inverse transformation, respectively, to reconstruct the residual block in the pixel domain for later use as a reference block of a reference picture. For TUs, coded in a transform skip mode, inverse quantization unit 58 applies inverse quantization to reconstruct the residual block, but as illustrated by data path 61, inverse transform processing unit 60 is bypassed. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

In this manner, video encoder 20 of FIG. 5 represents an example of a video encoder configured to determine for a chroma transform block (TB) a sub-sampling format for the chroma TB; based on the sub-sampling format for the chroma TB, identify one or more corresponding luma TBs; generate, for each of the one or more corresponding luma TBs, a flag indicating if the each one or more luma TBs are coded using a transform skip mode; and, based on a number of the one or more corresponding luma TBs coded using the transform skip mode being greater than or equal to a threshold value, encode the chroma TB using the transform skip mode without generating a syntax element indicating the chroma TB is coded using the transform skip mode.

Figure 6:
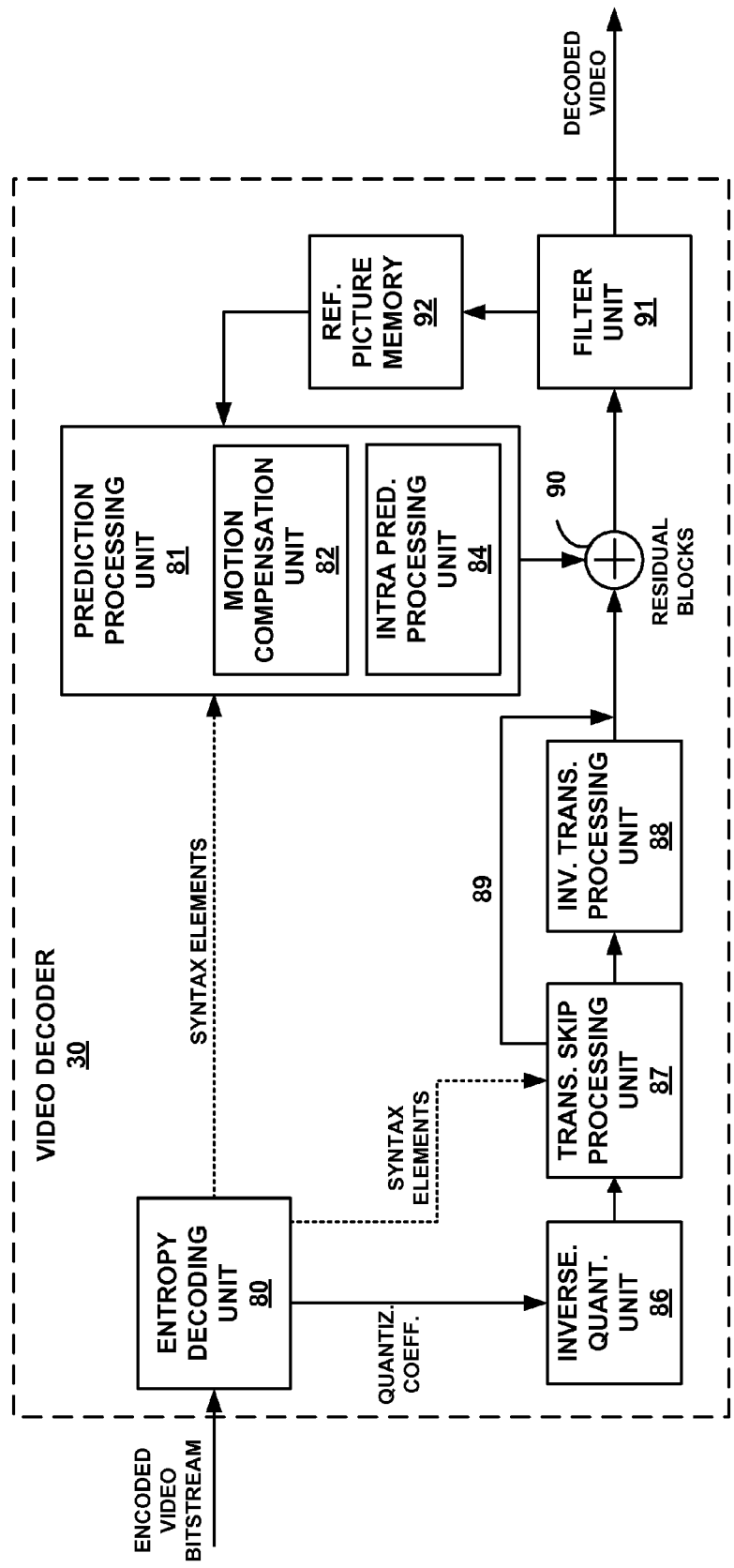
FIG. 6 is a block diagram illustrating an example video decoder that may implement the techniques described in this disclosure.

FIG. 6 is a block diagram illustrating an example video decoder 30 that may implement the techniques described in this disclosure. In the example of FIG. 6, video decoder 30 includes an entropy decoding unit 80, prediction unit 81, inverse quantization unit 86, transform skip processing unit 87, inverse transform processing unit 88, summer 90, filter unit 91, and reference picture memory 92. Prediction unit 81 includes motion compensation unit 82 and intra-prediction processing unit 84. Video decoder 30 may, in some examples, perform a decoding pass generally reciprocal to the encoding pass described with respect to video encoder 20 from FIG. 5.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized residual values, motion vectors, and other syntax elements. Such syntax elements may, for example, include the transform_skip_enabled_flag and transform_skip_flag syntax elements discussed above. The encoded video bitstream may further include some TUs coded in a transform mode and some TUs coded in a transform skip mode. For TUs coded in a transform mode, the quantized residual values represent quantized transform coefficients, while for TUs coded in a transform skip mode, the quantized residual values may represent quantized residual values. Entropy decoding unit 80 forwards the motion vectors and other syntax elements to prediction unit 81. Entropy decoding unit 80 also forwards syntax elements, such as the transform_skip_enabled_flag and transform_skip_flag syntax elements, to transform skip processing unit 87 which implements the decision for whether to code TUs in a transform mode or a transform skip mode. Video decoder 30 may receive the syntax elements in a PPS, SPS, APS, at the video slice level and/or the video block level.

When the video slice is coded as an intra-coded (I) slice, intra-prediction processing unit 84 of prediction unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., dequantizes, the quantized residual values provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Transform skip processing unit 87 is configured to implement either a transform mode or a transform skip mode. For TUs coded in a transform mode, inverse transform processing unit 88 applies an inverse transform, e.g., an inverse DCT, an inverse integer transform, or a conceptually similar inverse transform process, to the transform coefficients in order to produce residual blocks in the pixel domain. For TUs coded in a transform skip mode, transform skip processing unit 87 directs the dequantized residual values along data path 89, which bypasses inverse transform processing unit 88.

As described above, the TUs received in the encoded bitstream include both luma TUs and chroma TUs. For the luma TUs, transform skip processing unit 87 may determine if the luma TUs are coded in a transform skip mode based on syntax elements associated with the luma TUs. For chroma TUs, however, rather than receiving syntax elements identifying if the chroma TU is coded in a transform skip mode, transform skip processing unit 87 may derive the syntax elements to determine if the chroma TUs are coded in the transform skip mode, meaning that video decoder 30 does not explicitly receive syntax elements indicating if the chroma TUs are coded in the transform skip mode.

For example, for a particular chroma TU, transform skip processing unit 87 can determine for the chroma TU a sub-sampling format. Based on the sub-sampling format for the chroma TU, transform skip processing unit 87 can identify one or more corresponding luma TBs. For example, if the sub-sampling format corresponds to a 4:4:4 format, then transform skip processing unit 87 can identify one corresponding luma TB; if the sub-sampling format corresponds to a 4:2:2 format, then transform skip processing unit 87 can identify two corresponding luma TBs; or, if the sub-sampling format corresponds to a 4:2:0 format, then transform skip processing unit 87 can identify four corresponding luma TBs. For each of the one or more corresponding luma TBs, transform skip processing unit 87 can determine if the corresponding luma TB is coded using a transform skip mode and based on a number of the corresponding luma TBs coded using the transform skip mode being greater than or equal to a threshold value, transform skip processing unit 87 can determine if the chroma TB is coded in the transform skip mode.

After motion compensation unit 82 generates the predictive block for the current video block based on the motion vectors and other syntax elements, video decoder 30 forms a decoded video block by summing the residual blocks with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 6 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 of FIG. 6 represents an example of a video decoder configured to: determine for a chroma transform block (TB) a sub-sampling format for the chroma TB; based on the sub-sampling format for the chroma TB, identify one or more corresponding luma TBs; receive, for each of the one or more corresponding luma TBs, a flag indicating if the corresponding luma TB is coded using a transform skip mode; and, based on a number of the one or more corresponding luma TBs coded using the transform skip mode being greater than or equal to a threshold value, determining that the chroma TB is coded in the transform skip mode.

Figure 7:
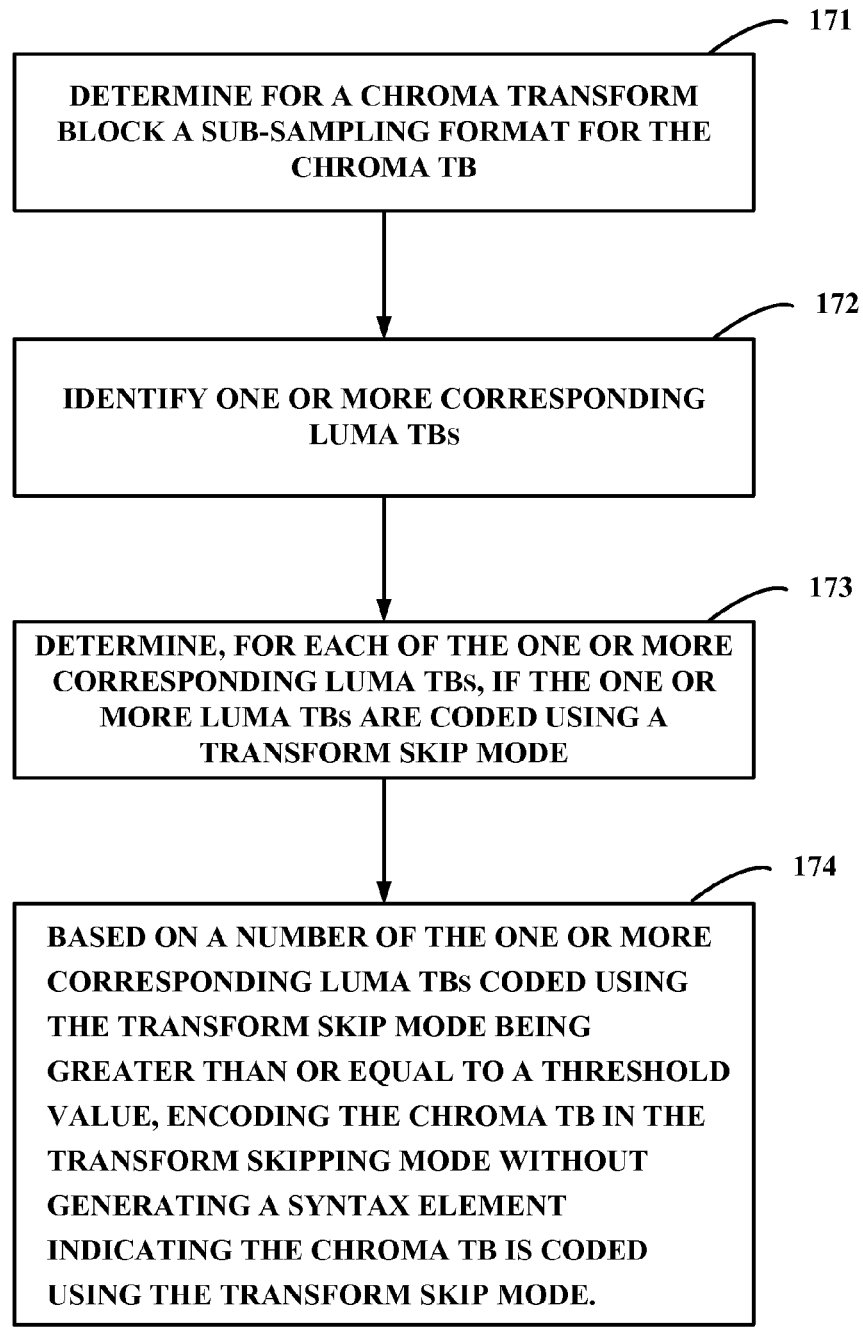
FIG. 7 is a flow diagram illustrating a method for encoding video data in accordance with the techniques of this disclosure.

FIG. 7 is a flow diagram illustrating a method for encoding video data in accordance with the techniques of this disclosure. The techniques of FIG. 7 may, for example, be performed by video encoder 20. Video encoder 20 determines for a chroma TB a sub-sampling format for the chroma TB (171). The sub-sampling format may, for example, be a 4:4:4 format, a 4:2:2 format, or a 4:2:0 format. Based on the sub-sampling format for the chroma TB, video encoder 20 identifies one or more corresponding luma TBs (172). The number of corresponding luma TBs may, for example, be one for a chroma TB with a 4:4:4 format, two for a chroma TB with a 4:2:2 format, or four for a chroma TB with a 4:2:0 format. Video encoder 20 determines, for each of the one or more corresponding luma TBs, if the corresponding luma TB is coded using a transform skip mode (173). Based on a number of the one or more corresponding luma TBs coded using the transform skip mode being greater than or equal to a threshold value, video encoder 20 encodes the chroma TB using a transform skip mode without generating a syntax element indicating the chroma TB is coded using the transform skip mode (174).

Figure 8:
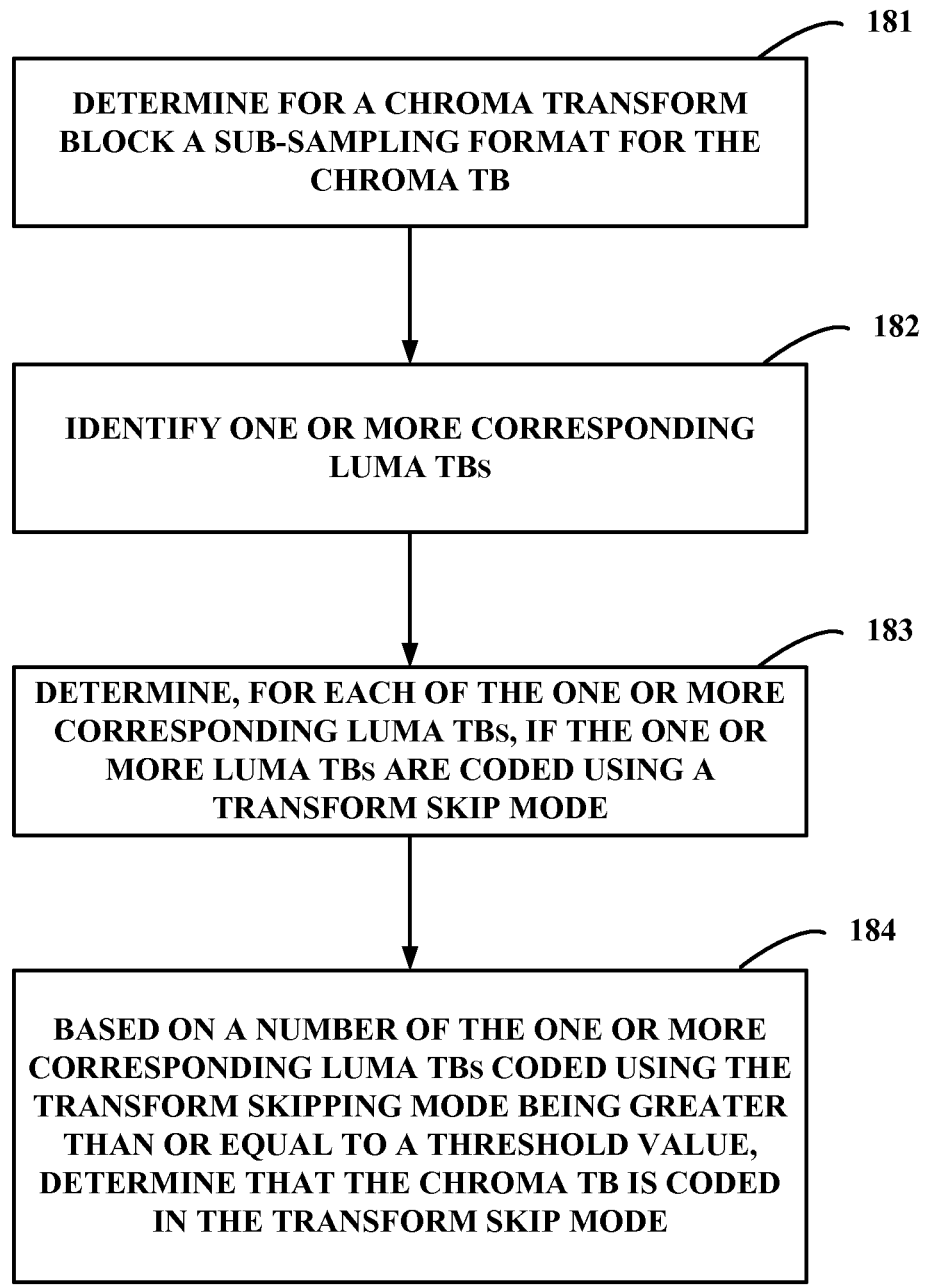
FIG. 8 is a flow diagram illustrating a method for decoding video data in accordance with the techniques of this disclosure.

FIG. 8 is a flow diagram illustrating a method for decoding video data in accordance with the techniques of this disclosure. The techniques of FIG. 8 may, for example, be performed by video decoder 30. Video decoder 30 determines for a chroma TB a sub-sampling format for the chroma TB (181). The sub-sampling format may, for example, be a 4:4:4 format, a 4:2:2 format, or a 4:2:0 format. Based on the sub-sampling format for the chroma TB, video decoder 30 identifies one or more corresponding luma TBs (182). The number of corresponding luma TBs may, for example, be one for a chroma TB with a 4:4:4 format, two for a chroma TB with a 4:2:2 format, or four for a chroma TB with a 4:2:0 format. Video decoder 30 determines, for each of the one or more corresponding luma TBs, if the corresponding luma TB is coded using a transform skip mode (183). Video decoder 30 may, for example, make such determination by receiving a flag for each of the one or more corresponding luma TBs. Based on a number of the one or more corresponding luma TBs coded using the transform skip mode being greater than or equal to a threshold value, video decoder 30 determines that the chroma TB is coded in the transform skip mode (184).

As one example, if the sub-sampling format corresponds to a 4:4:4 format, then the one or more corresponding luma TBs may consist of one corresponding luma TB, and the threshold in such an example may be equal to 1. Thus, if the corresponding luma TB is decoded using a transform skip mode, then video decoder 30 also decodes the chroma TB using the transform skip mode. If the corresponding luma TB is decoded not using a transform skip mode, then video decoder 30 also decodes the chroma TB not using the transform skip mode. As another example, if the sub-sampling format corresponds to a 4:2:2 format, then the one or more corresponding luma TBs may consist of two corresponding luma TBs, and the threshold value may be greater than or equal to 1. Thus, if one or both of the corresponding luma TBs is decoded using a transform skip mode, then video decoder 30 also decodes the chroma TB using the transform skip mode. If both of the corresponding luma TBs are decoded without using a transform skip mode, then video decoder 30 also decodes the chroma TB without using the transform skip mode. In some instances, the threshold may be two instead of one, such that video decoder 30 only decodes the chroma TB using the transform skip mode if both corresponding luma TBs are decoded using the transform skip mode. As another example, if the sub-sampling format corresponds to a 4:2:0 format, then the one or more corresponding luma TBs consists of four corresponding luma TB, and the threshold value may be equal to N, where N is an integer value between 1 and 4. Thus, if N of the corresponding luma TBs are coded using a transform skip mode, then video decoder 30 decodes the chroma TB using the transform skip mode. If less than N of the corresponding luma TBs are coded without using a transform skip mode, then video decoder 30 also decodes the chroma TB without using the transform skip mode.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a sub-sampling format for a chroma transform block (TB);
   based on the sub-sampling format for the chroma TB, identifying one or more corresponding luma TBs;
   determining if a size of a coding unit comprising the chroma TB is equal to a smallest enabled size for coding units;
   in response to determining that the size of the coding unit is equal to the smallest enabled size, receiving, for each of the one or more corresponding luma TBs, a flag indicating if the corresponding luma TB is coded using a transform skip mode; and
   based on a number of the one or more corresponding luma TBs coded using the transform skip mode being greater than or equal to a threshold value, determining that the chroma TB is coded in the transform skip mode.

2. The method of claim 1, wherein the sub-sampling format corresponds to a 4:4:4 format, and wherein the one or more corresponding luma TBs consists of one corresponding luma TB, and wherein the threshold value is equal to 1.

3. The method of claim 1, wherein the sub-sampling format corresponds to a 4:2:2 format, and the one or more corresponding luma TBs consists of two corresponding luma TBs, and wherein the threshold value is greater than or equal to 1.

4. The method of claim 1, wherein the sub-sampling format corresponds to a 4:2:0 format and the one or more corresponding luma TBs consists of four corresponding luma TBs, and wherein the threshold value is equal to N, wherein N is an integer value between 1 and 4, inclusive.

5. The method of claim 1, wherein receiving, for each of the one or more corresponding luma TBs, the flag indicating if the corresponding luma TB is coded using the transform skip mode comprises receiving one or more syntax elements for the corresponding luma TB, wherein the one or more syntax elements indicate if the corresponding TB is coded using the transform skip mode.

6. The method of claim 1, wherein the smallest enabled size is determined based on a parameter set for coded video.

7. The method of claim 1, wherein the flag indicates if luminance components of the coding unit are coded using a transform skip mode.

8. The method of claim 7, further comprising:
   based on at least the flag indicating if luminance components of the coding unit are coded using a transform skip mode, deriving if chrominance components of the coding unit are coded using a transform skip mode.

9. A method of encoding video data, the method comprising:
   determining a sub-sampling format for a chroma transform block (TB);
   based on the sub-sampling format for the chroma TB, identifying one or more corresponding luma TBs;
   determining if a size of a coding unit comprising the chroma TB is equal to a smallest enabled size for coding units;
   in response to determining that the size of the coding unit is equal to the smallest enabled size, generating, for each of the one or more corresponding luma TBs, a flag indicating if the corresponding TB is coded using a transform skip mode; and
   based on a number of the one or more corresponding luma TBs coded using the transform skip mode being greater than or equal to a threshold value, encoding the chroma TB using the transform skip mode without generating a syntax element indicating the chroma TB is coded using the transform skip mode.

10. The method of claim 9, wherein the sub-sampling format corresponds to a 4:4:4 format, and wherein the one or more corresponding luma TBs consists of one corresponding luma TB, and wherein the threshold value is equal to 1.

11. The method of claim 9, wherein the sub-sampling format corresponds to a 4:2:2 format, and the one or more corresponding luma TBs consists of two corresponding luma TBs, and wherein the threshold value is greater than or equal to 1.

12. The method of claim 9, wherein the sub-sampling format corresponds to a 4:2:0 format and the one or more corresponding luma TBs consists of four corresponding luma TBs, and wherein the threshold value is equal to N, wherein N is an integer value between 1 and 4, inclusive.

13. The method of claim 9, wherein generating, for each of the one or more corresponding luma TBs, the flag indicating if the corresponding TB is coded using the transform skip mode comprises generating one or more syntax elements for the corresponding luma TB, wherein the one or more syntax elements indicate if the corresponding luma TB is coded using the transform skip mode.

14. A device for coding video data, the device comprising:
   a memory configured to store video data; and
   a video coder configured to:
      determine a sub-sampling format for a chroma transform block (TB) of the video data;
      based on the sub-sampling format for the chroma TB, identify one or more corresponding luma TBs;

determine if a size of a coding unit comprising the chroma TB is equal to a smallest enabled size for coding units;

in response to determining that the size of the coding unit is equal to the smallest enabled size, code, for each of the one or more corresponding luma TBs, a flag indicating if the corresponding luma TB is coded using a transform skip mode; and based on a number of the one or more corresponding luma TBs coded using the transform skip mode being greater than or equal to a threshold value, determine that the chroma TB is coded in the transform skip mode.

15. The device of claim 14, wherein the sub-sampling format corresponds to a 4:4:4 format, and wherein the one or more corresponding luma TBs consists of one corresponding luma TB, and wherein the threshold value is equal to 1.

16. The device of claim 14, wherein the sub-sampling format corresponds to a 4:2:2 format, and the one or more corresponding luma TBs consists of two corresponding luma TBs, and wherein the threshold value is greater than or equal to 1.

17. The device of claim 14, wherein the sub-sampling format corresponds to a 4:2:0 format and the one or more corresponding luma TBs consists of four corresponding luma TBs, and wherein the threshold value is equal to N, wherein N is an integer value between 1 and 4, inclusive.

18. The device of claim 14, wherein the video coder determines, for each of the one or more corresponding luma TBs, if the corresponding luma TB is coded using the transform skip mode by coding one or more syntax elements for the corresponding luma TB, wherein the one or more syntax elements indicate if the corresponding luma TB is coded using the transform skip mode.

19. The device of claim 14, wherein the smallest enabled size is determined based on a parameter set for coded video.

20. The device of claim 14, wherein the flag indicates if luminance components of the coding unit are coded using a transform skip mode.

21. The device of claim 20, wherein the video coder is further configured to, based on at least the flag indicating if luminance components of the coding unit are coded using a transform skip mode, derive if chrominance components of the coding unit are coded using a transform skip mode.

22. The device of claim 14, wherein the video coder comprises a video decoder.

23. The device of claim 14, wherein the video coder comprises a video encoder.

24. The device of claim 14, wherein the device comprises at least one of:
an integrated circuit;
a microprocessor; and
a wireless communication device that includes the video coder.

25. An apparatus for coding video data, the apparatus comprising:
means for determining a sub-sampling format for a chroma transform block (TB);
means for identifying one or more corresponding luma TBs based on the sub-sampling format for the chroma TB;
means for determining if a size of a coding unit comprising the chroma TB is equal to a smallest enabled size for coding units;
means for coding, in response to determining that the size of the coding unit is equal to the smallest enabled size, for each of the one or more corresponding luma TBs, a flag indicating if the corresponding luma TB is coded using a transform skip mode; and means for determining that the chroma TB is coded in the transform skip mode based on a number of the one or more corresponding luma TBs coded using the transform skip mode being greater than or equal to a threshold value.

26. The apparatus of claim 25, wherein the sub-sampling format corresponds to a 4:4:4 format, and wherein the one or more corresponding luma TBs consists of one corresponding luma TB, and wherein the threshold value is equal to 1.

27. The apparatus of claim 25, wherein the sub-sampling format corresponds to a 4:2:2 format, and the one or more corresponding luma TBs consists of two corresponding luma TBs, and wherein the threshold value is greater than or equal to 1.

28. The apparatus of claim 25, wherein the sub-sampling format corresponds to a 4:2:0 format and the one or more corresponding luma TBs consists of four corresponding luma TBs, and wherein the threshold value is equal to N, wherein N is an integer value between 1 and 4, inclusive.

29. The apparatus of claim 25, wherein
the means for coding, for each of the one or more corresponding luma TBs, the flag indicating if the corresponding luma TB is coded using a transform skip mode comprises means for decoding.

30. The apparatus of claim 25, wherein
the means for coding, for each of the one or more corresponding luma TBs, the flag indicating if the corresponding luma TB is coded using a transform skip mode comprises means for encoding.

31. A computer readable storage medium storing instructions that when executed cause one or more processors to:
determine a sub-sampling format for a chroma transform block (TB);
identify one or more corresponding luma TBs based on the sub-sampling format for the chroma TB;
determine if a size of a coding unit comprising the chroma TB is equal to a smallest enabled size for coding units;
in response to determining that the size of the coding unit is equal to the smallest enabled size, code, for each of the one or more corresponding luma TBs, a flag indicating if the corresponding luma TB is coded using a transform skip mode; and
determine that the chroma TB is coded in the transform skip mode based on a number of the one or more corresponding luma TBs coded using the transform skip mode being greater than or equal to a threshold value.

32. The computer readable storage medium of claim 31, wherein the sub-sampling format corresponds to a 4:4:4 format, and wherein the one or more corresponding luma TBs consists of one corresponding luma TB, and wherein the threshold value is equal to 1.

33. The computer readable storage medium of claim 31, wherein the sub-sampling format corresponds to a 4:2:2 format, and the one or more corresponding luma TBs consists of two corresponding luma TBs, and wherein the threshold value is greater than or equal to 1.

34. The computer readable storage medium of claim 31, wherein the sub-sampling format corresponds to a 4:2:0 format and the one or more corresponding luma TBs consists of four corresponding luma TBs, and wherein the threshold value is equal to N, wherein N is an integer value between 1 and 4, inclusive.

* * * * *